Feb. 14, 1950 W. C. BAYNES 2,497,064
GREETING CARD AND ENVELOPE ASSEMBLY
Filed May 22, 1947 5 Sheets-Sheet 2
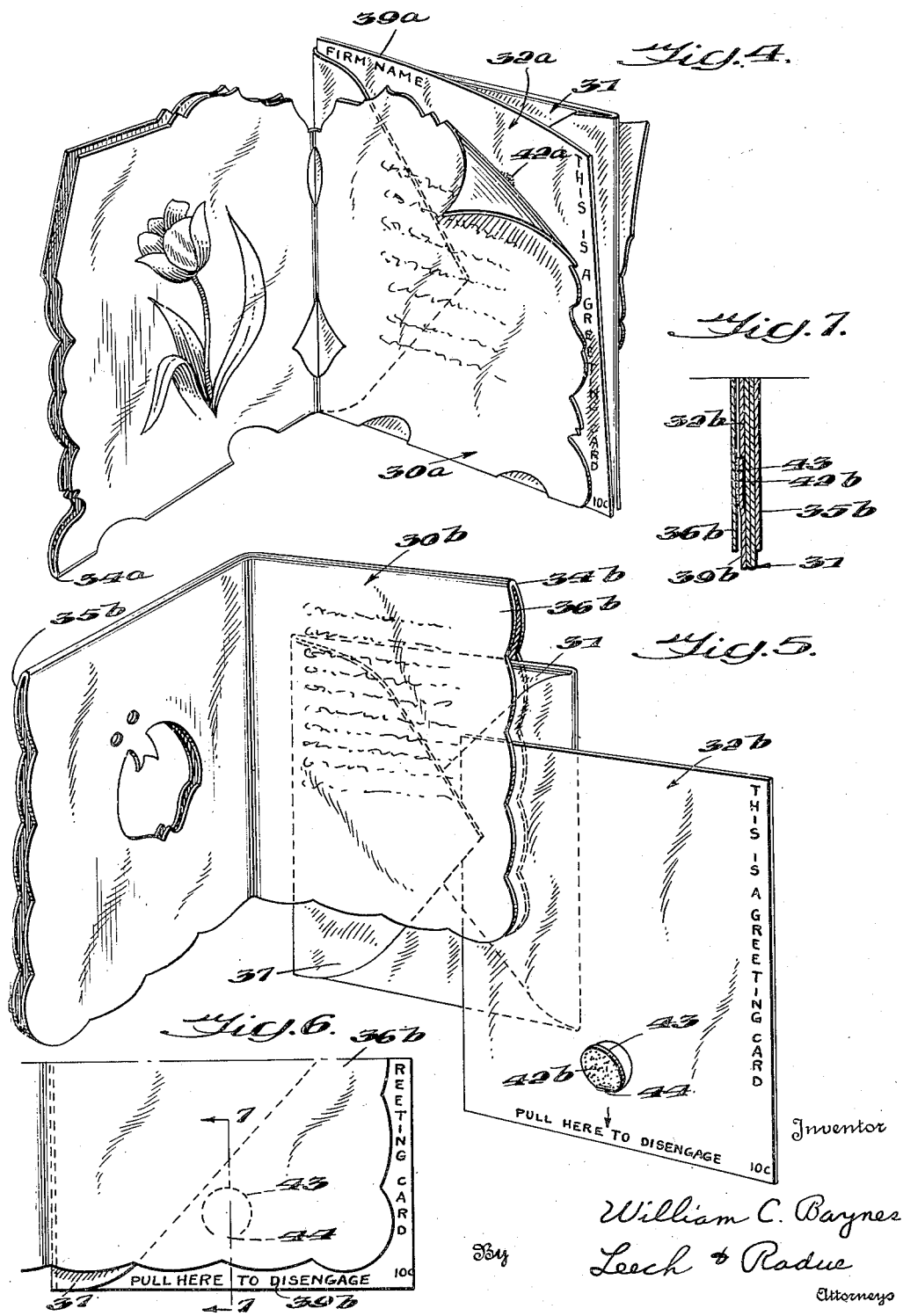
Inventor
William C. Baynes
By Leech & Radue
Attorneys Feb. 14, 1950 W. C. BAYNES 2,497,064
GREETING CARD AND ENVELOPE ASSEMBLY
Filed May 22, 1947 5 Sheets-Sheet 3
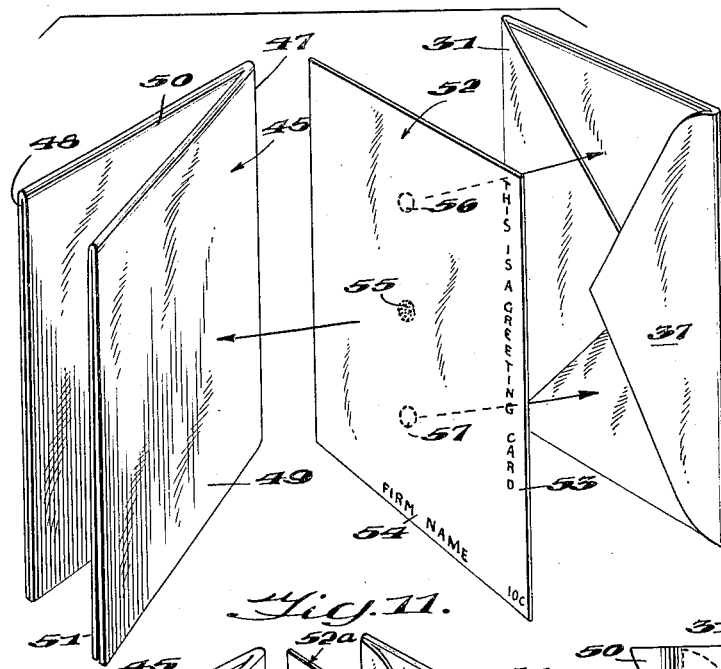
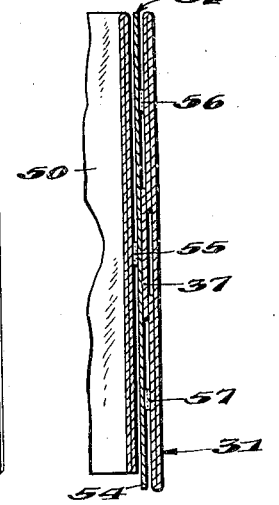
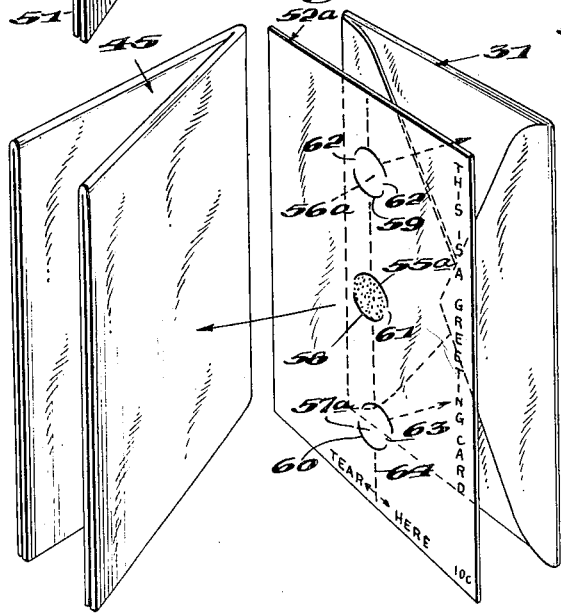
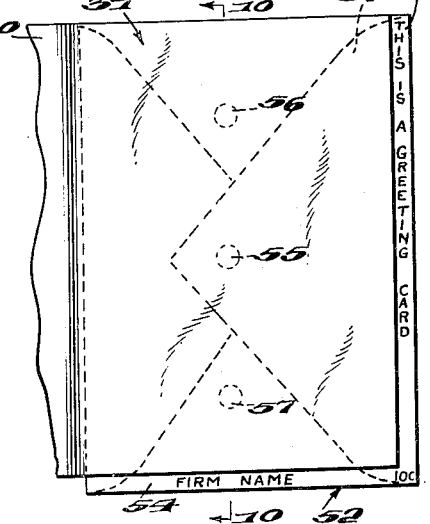
Inventor
William C. Baynes
By Leech & Radue
Attorneys

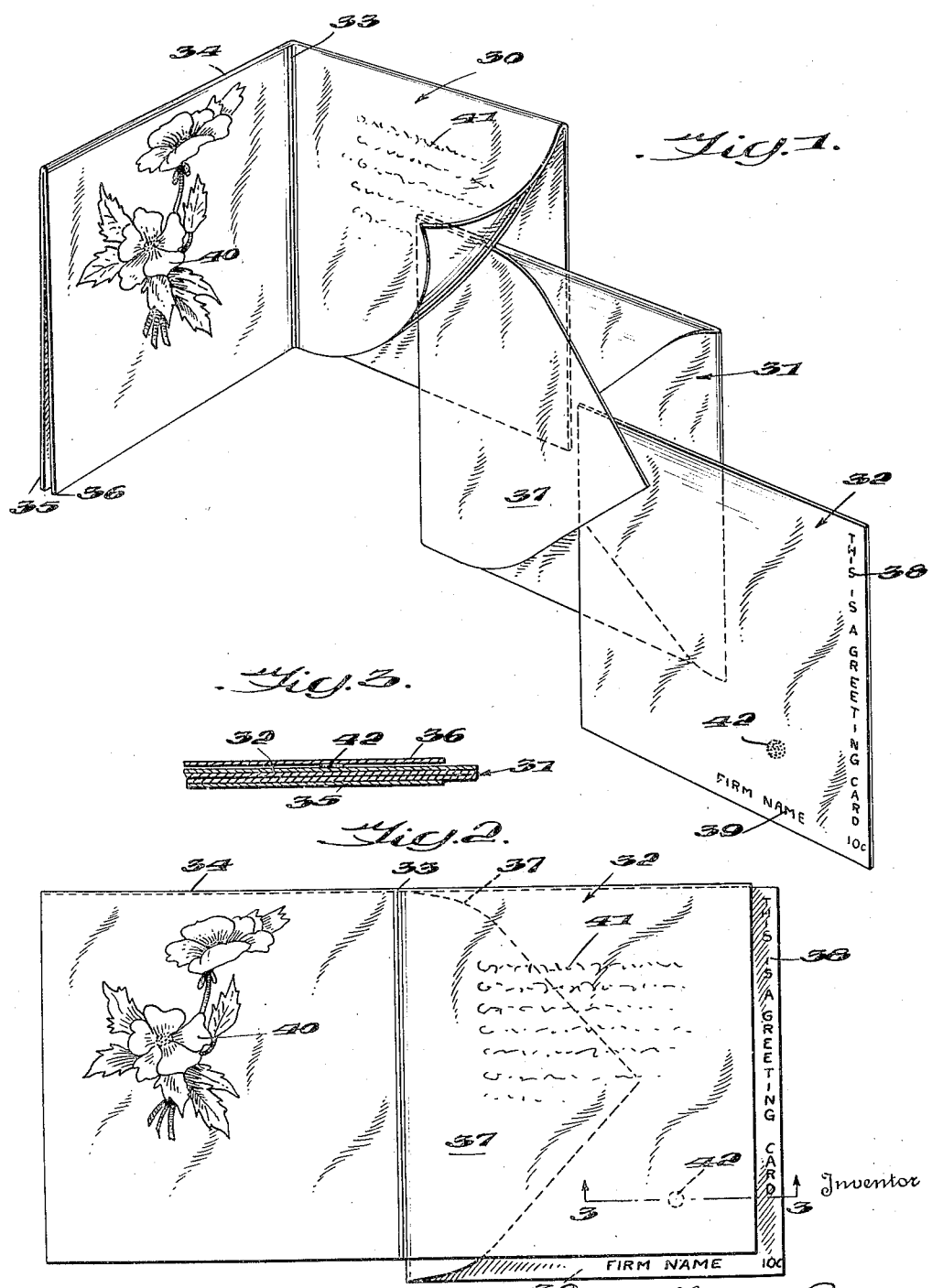

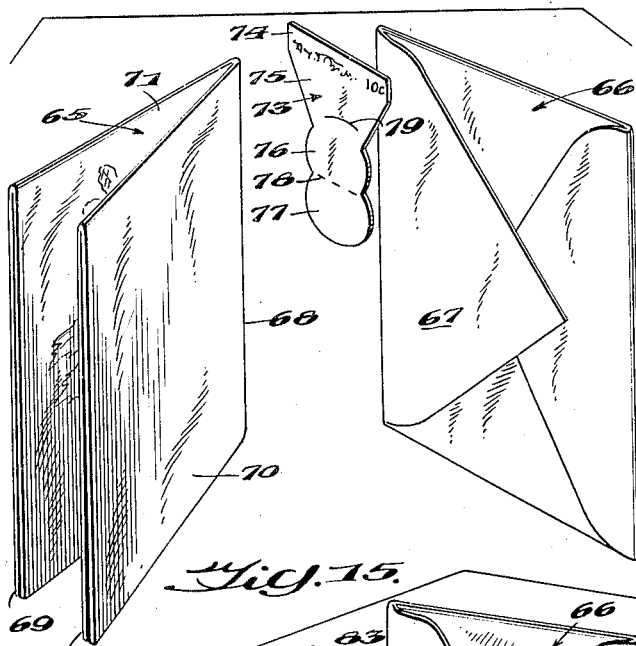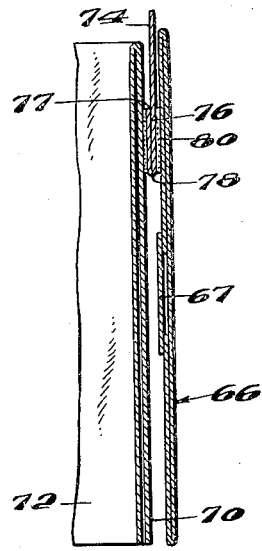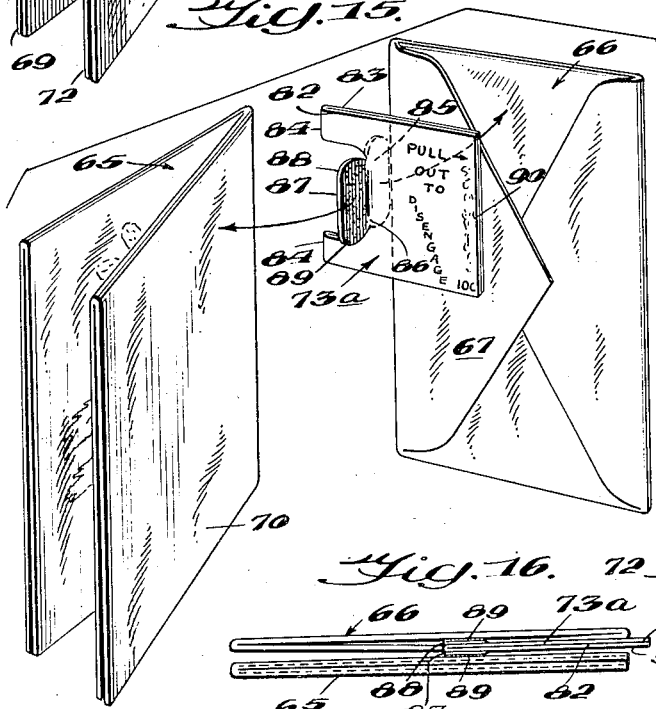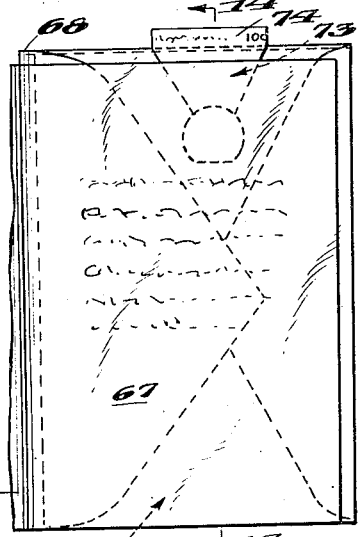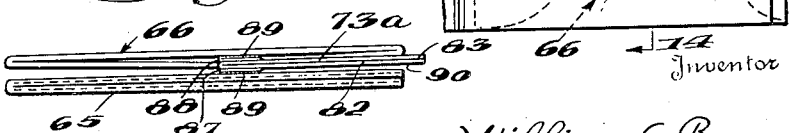

Feb. 14, 1950 W. C. BAYNES 2,497,064
GREETING CARD AND ENVELOPE ASSEMBLY
Filed May 22, 1947 5 Sheets-Sheet 5
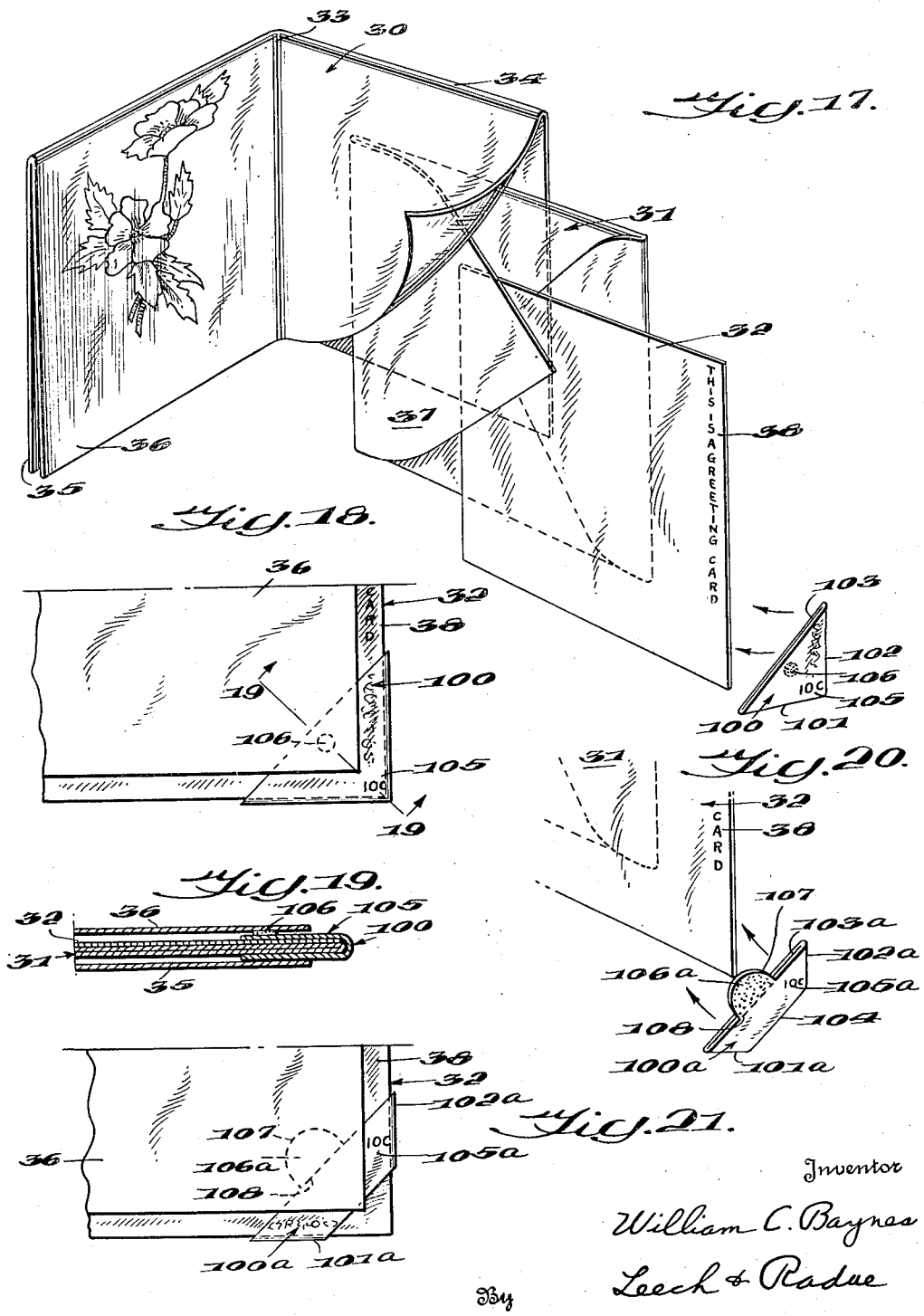
Inventor
William C. Baynes
Leech & Radue
By
Attorneys Patented Feb. 14, 1950

2,497,064

UNITED STATES PATENT OFFICE 2,497,064

GREETING CARD AND ENVELOPE ASSEMBLY

William C. Baynes, Washington, D. C.

Application May 22, 1947, Serial No. 749,748

12 Claims. (Cl. 229—92.8)

This invention relates to improvements in the assembly of a greeting card with its envelope as an article of manufacture.

The tremendous volume of greeting card sales and the relative size of the business of retailers of greeting cards have demanded more efficient and better means of price marking and associating a greeting card with the envelope therefor. It is unsatisfactory to apply the price to cartons from which the cards and matched envelopes are taken by a customer, as the cards are frequently returned to the wrong carton and the envelopes tend to become separated. Besides being slow and tedious, the application of price designation to individual cards or their envelopes is objectionable because of soiling or defacement and the need for erasure when a sale is made. The present preferred practice includes the association of greeting cards and their envelopes by means of metallic clips which hold a price ticket against a face of the card which is ordinarily examined by a prospective buyer. While elaborate and efficient machines have been devised for such clip ticket associating, the cards tend to become marred by indentation or bending produced by the metallic clip, and often the clip itself will become corroded and mark the card so as to render it unsaleable. Even with such machines, a substantial capital investment by the card retailer, appreciable labor costs, and delay in getting the card stock ready for sale are necessary incidents.

It is, therefore, the principal object of this invention to provide a secure assembly of conventional greeting card and conventional envelope by means of an intermediate sheetlike member, bearing price and other desirable printing matter, adhesively secured to an unexposed or undecorated face of the card and detachably connected to the envelope for ready separation at the time of sale.

Where the word "card" is used herein, it is intended to mean any conventional card such as those formed by a single sheet, folded sheets, French-folded sheet cards, and other flat cards, except where a more limited meaning is ascribed. Likewise the term "envelope" is to be taken in a broad sense to include any conventional type flat envelope which is suitable for the purpose, unless specially qualified.

In accordance with a preferred embodiment of this invention, a French-folded card is securely retained in assembled relation with its slightly larger envelope by an intermediate sheet interleaved with the closure flap of the envelope and adhesively secured to an unexposed face of the card so as to be readily detachable. When this insert sheet is made coextensive with the envelope and arranged thereover, it will provide vertical and horizontal marginal extensions for price marking and other indicia which will be readily visible when the card is inspected in a normal manner. The portion of this intermediate sheet covered by the card may also be advantageously used to include a designation of the manufacturer, its trade-mark, and the name of the retail store.

In a modification of the invention the insert or intermediate sheet is adhesively secured to the envelope as well as the card at points spaced heightwise of the card so as not to require interleaving with the closure flap of the envelope.

Further modifications within the principles of this invention include the utilization of an intermediate sheetlike member having a marginal extension beyond the card, but extending over only a portion of the envelope, and adhesively secured to the back face of the card and the adjacent face of the envelope by means of readily severable tabs which remain secured to the card and envelope, respectively.

An additional modified assembly includes the insertion between the sheets of a French-folded card of an envelope with an insert sheet interleaved with the closure flap, and a corner member extending over the exposed outer corner of the envelope and insert and adhesively secured to the adjacent inside face of the card. Price marking indicia may be applied to the marginal portion of the corner which extends beyond the card along with the extending vertical and marginal portions of the insert sheet. The adhesive connection between the card and corner are such that the latter may be readily pulled off, thus releasing the envelope and the insert sheet from their assembled relation with the card.

These and other features of improvement contributing to economy in manufacture and use and commercial acceptability of the greeting card and envelope assembly will be more apparent from the following detailed description of preferred embodiments of this invention, taken in connection with the accompanying drawings, in which:

Fig. 1 is a partially exploded perspective view of a French-folded card and the envelope and insert sheet with which it is assembled;

Fig. 2 is an inside elevational view of the card with the envelope and insert sheet in completely assembled relation;

Fig. 3 is a partial cross-sectional view taken on line 3—3 of Fig. 2 and showing certain parts on an enlarged scale;

Fig. 4 is a perspective view of a modified assembly taken from the inside of the greeting card with certain parts turned back to show details of construction;

Fig. 5 shows an exploded perspective view of the assembly of Fig. 1 with modifications of the insert sheet;

Fig. 6 is a partial elevational view of the completed assembly of Fig. 5;

Fig. 7 is a fragmentary sectional view of the assembly taken on the line 7—7 of Fig. 6;

Fig. 8 is an exploded sectional view of a modified assembly including card, envelope, and intermediate sheet;

Fig. 9 is a partial elevational view of the parts of Fig. 8 in assembled relation;

Fig. 10 is a cross-sectional view of card, intermediate sheet and envelope taken on the line 10—10 of Fig. 9;

Fig. 11 shows an exploded perspective view, a slight modification of the assembly of Fig. 8, and particularly the intermediate sheet;

Fig. 12 shows by an exploded perspective view a modified assembly including card, envelope, and intermediate sheet of reduced area;

Fig. 13 is a partial elevational view showing the parts of Fig. 12 in assembled relation;

Fig. 14 is a cross-sectional view taken on the line 14—14 of Fig. 13;

Fig. 15 illustrates by an exploded perspective view a modification of Fig. 12 in which the reduced area intermediate sheet is formed and arranged somewhat differently;

Fig. 16 is a top elevational view showing the parts of Fig. 15 in final assembled relation;

Fig. 17 shows in exploded perspective view a further modification in which an envelope having an interleaved insert sheet is arranged between the sheets of a French-folded card and retained by a corner member;

Fig. 18 is a partial elevational view of the modification of Fig. 17 with the parts in assembled relation;

Fig. 19 is a sectional view of Fig. 18 taken on the line 19—19;

Fig. 20 is an exploded and fragmentary perspective view of the assembly of Fig. 17 with a modified corner member; and Fig. 21 is a partial elevational view of the parts of Fig. 20 in final assembled relation.

In the assembly of Figs. 1, 2 and 3, a conventional greeting card 30 of the French-folded type is associated with an envelope 31, which will necessarily be slightly larger in its length and breadth, and a relatively thin sheet 32 of the same size as the outline of the envelope. The card 30 has a vertical fold line 33 and a horizontal fold line 34 at its upper edge dividing the card into outer and inner sheets or plies 35 and 36. The conventional rectangular envelope 31 is provided with the customary gummed closure flap 37.

The insert sheet 32 has an extending vertical margin portion 38 and an adjacent extending horizontal margin portion 39 on which price, firm and any other desired indicia or information can be imprinted.

As indicated in Fig. 1, the opposed inner faces of the card may be provided with a decorative figure 40 and a greeting legend 41. It is also customary to decorate the front outer face of the card and to inscribe it in a manner which it is not necessary to show.

The lower right corner portion of the sheet 32 carries a spot or dot of adhesive 42. The adhesive 42 will be any one of a large variety which are commercially available, for example, one which may be activated by moisture or one of a pressure sensitive type which can be substantially completely removed with the sheet 32 after use in the manner to be explained. The adhesive selected will be one which will not appreciably wet and thus mar or otherwise damage the card 30 to which it is directly connected.

To form the assembled combination shown in Figs. 2 and 3, the sheet 32 may be interleaved with the envelope closure flap 37 and inserted therewith between the card plies 35 and 36 on the right hand side beneath the greeting 41. When so assembled the hinge of the closure flap 37 will coincide with the vertical fold line 33, and the adjacent edge of the envelope will coincide with and abut the corresponding portion of the horizontal fold line 34. This arrangement leaves the indicia bearing marginal extensions 38 and 39 in plain view of one examining the inside of the card 30 or the front face when both halves of the card are folded together. This relation and assembly are most securely maintained by connection of the imprinted side of sheet 32 and the adjacent surface of the inner card sheet 36 by means of the adhesive 42, as shown most clearly in Fig. 3 where the thickness of the various parts have been exaggerated in the interests of clarity.

It will thus be seen that the intersecting folds of the card 30 form an anchor for the adjacent corner of the envelope 31 and interleaved insert sheet 32 and that the adhesive connection 42 between the diagonally opposite corners of the card ply 36 and the insert sheet 32, with the latter interleaved or interlocked by the closure flap 37, will effectively prevent dislodgment of the envelope and the insert sheet until the adhesive connection is broken by withdrawal and separation of the sheet 32.

The applicability of the principles of the invention, as illustrated in Figs. 1 to 3, to a scalloped or cut out French-folded card is illustrated in Fig. 4. A cut out card 30a of this type is associated in the same general manner with the envelope 31 and a similar insert sheet 32a. In this instance, the card 30 is formed with a horizontal fold line 34a at the bottom, which results in a positioning of a horizontal marginal extension 39a above the top edge of the card, the relative position of the vertical marginal extension of the insert sheet being unchanged. This inverted arrangement has a particular advantage in that the interleaved envelope 31 and insert sheet 32a are positively supported by the lower horizontal fold of the card 30a. This arrangement minimizes the strain on an adhesive connection 42a between the upper corners of the card 30a and the insert sheet 32a, and avoids the possibility of shaking the envelope and insert sheet free from the bottom edge of the card.

In the assembly of Fig. 4, as well as the one shown in Fig. 2, the adhesive connection is outwardly of the closure flap 37 and near the corner furthest removed from the intersection of the card folds so as to be most effective in preventing rotational separation of the envelope and insert sheet from the card.

A still further modification of the assembly of this invention is shown in Figs. 5, 6 and 7 in which a scalloped, cut out French-folded card 30b is associated with the envelope 31 and a generally similar insert sheet 32b in nearly the same manner illustrated in Figs. 1 to 3. The card 30b has a horizontal fold line 34b at the top providing a horizontal marginal extension 39b of the envelope 31 and superimposed insert sheet 32b at the bottom of the card.

The insert sheet 32b is provided with an adhesive area 42b near its lower edge and outwardly of the card with respect to the envelope closure flap 37. The adhesive 42b is carried by a disc or tab 43 cut out of the sheet 32b and hinged thereto at its lower portion by a short connection or severable tear line 44.

When the insert sheet 32b is interleaved with the envelope closure flap 37 and both parts inserted between the folded sheets of the card 30b as shown best in Fig. 6, the adhesive 42b will be directly connected to the adjacent face of the inner fold of the card to maintain the assembly in the desired relation. When a sale has been made, the envelope may be separated and the price removed by pulling on the extending lower marginal edge of both the envelope 31 and the insert sheet 32b in the downward direction indicated. This will break the tear line 44 and leave the disc or tab 43 adhered to the inside of the inner card fold 36b in the manner suggested by the exaggerated section of Fig. 7. There will be no possibility of adherence between the two sheets or plies 35b and 36b of the card as the then exposed face of the disc 43 is not coated with adhesive.

A further extension of the principles of this invention is illustrated in the modified assembly of Figs. 8, 9 and 10 in which a conventional, folded sheet greeting card 45, illustrated specifically as French-folded, has a vertical fold 47, a front face 48, back face 49 and opposed inner faces 50 and 51. An intermediate sheet 52 is employed in slightly different fashion to maintain the envelope 31 in assembled relation behind the back face 49 of the card. As the sheet 52 need not be interleaved with the envelope closure flap 37, the latter may be positioned adjacent the outer edge of the card 50 and completely covered by the coextensive intermediate sheet. The relatively larger size of the envelope 31 and sheet 52, shown best in the assembled view of Fig. 9, leaves vertical and horizontal marginal extensions 53 and 54, on which may be imprinted price and other indicia, either before or after assembly.

A central adhesive spot 55 on the sheet 52 is connected directly to the back card face 49 and two additional adhesive spots or areas 56 and 57 above and below spot 55 and on the opposite face of the sheet 52 will provide direct connection with the adjacent face of the envelope at the points indicated in the exploded view of Fig. 8.

With this form of assembly, it is practically necessary that an adhesive be used which will leave the contacted parts of the card 50 and the envelope 31 non-tacky when the sheet 52 is removed following a sale of the card. Both moisture activated and pressure sensitive adhesives possessing this property to the desired degree are available. It should be noted that the vertical spacing of the adhesive areas 55, 56 and 57 will be effective in maintaining the desired assembled relation and makes insertion within the card 50 or interleaving with the envelope 31 unnecessary.

Fig. 11 illustrates a modification of the intermediate sheet assembly of Figs. 8 to 10, which differs principally in that a modified intermediate sheet 52a is provided with adhesive areas 55a, 56a and 57a arranged in the same manner previously described, but carried on discs 58, 59 and 60, respectively, partially cut out from the intermediate sheet. Each disc is retained in position in the intermediate sheet 52a by means of short tear connections 61, 61, 62, 62 and 63, 63 at opposite edges as clearly shown. To further facilitate removal of the intermediate sheet 52a and separation of the adhesive carrying discs 58, 59 and 60 therefrom, a vertical line of spaced perforations 64 intersecting the cut out discs provides a tear line operable in the manner indicated by the legend at the bottom margin of the sheet. The central disc 58 will remain adhered to the back face of the card 45, and the discs 59 and 60 spaced on opposite sides thereof will remain adhered to the back face of the envelope 31 in the positions indicated by the arrows in this view.

Because of the exposed nature of the thus separated discs, coloring, designs, or suitable printed matter may be applied to the uncoated face of each, preferably at the time the intermediate sheet is prepared.

The modifications shown in Figs. 12 to 16 represent further extensions of the use of an intermediate sheet between the back of a greeting card and the envelope therefor. It will be observed from these figures that it is not absolutely essential that the intermediate sheet member be coextensive in area with the envelope so long as it can be arranged to provide a marginal extension for indicia and a secure adhesive connection between the card and envelope.

In Figs. 12, 13 and 14, a conventional folded greeting card 65, illustrated specifically as French-folded, is associated with a slightly larger conventional envelope 66 having a closure flap 67 disposed adjacent the card. The card 65 is further characterized by a vertical fold line 68, a front face 69 which may be ornamented in a manner not shown, and a back face 70, which is usually left blank. Opposed inner faces 71 and 72 will bear whatever figures, decoration and greetings may be desired.

The card 65 and the envelope 66 are maintained in assembled relation by an intermediate sheet or member 73 formed to provide an upper rectangular portion 74 bearing the price and any other desired indicia and arranged as a marginal extension. Below the portion 74 is a downwardly tapered portion 75 connected to disc-shaped portions or tabs 76 and 77 separated by a perforated dividing or tear line 78 extending horizontally and being readily severable from tapered portion 75 by reason of a partial cut out line 79. The back faces of the disc-shaped portions or tabs 76 and 77, as viewed in Fig. 12, are provided with adhesive coatings 80, 80, shown in the assembled sectional view of Fig. 14.

Before the card 65 and the envelope 66 are adhesively connected together, the lower tab 77 is bent upwardly about the dividing line 78 into the position shown in Fig. 14. The location of the dividing line 78 as a bottom hinge between the tabs 76 and 77 will provide the necessary support for the envelope 66. After a sale, the abbreviated intermediate sheet 73 may be disassociated from the card 65 and envelope 66 by a pull on its extending marginal portion 74, and a relative separation of the card and envelope will break the dividing line 78, leaving tab 77 adhered to the back face 68 of the card and the tab 76 adhered to the upper portion of the envelope 66 in the position indicated best by the assembled view of Fig. 13. It will be observed that the tab 76 is located nearly centrally of the upper portion of the envelope and clear of the closure flap 67. In this instance also, decorative effects or indicia may be applied to the exposed faces of the tabs 76 and 77 which remain associated with the envelope and card, respectively.

The modified assembly combination shown in Figs. 15 and 16 differs from that of Figs. 12 to 14 in that an intermediate sheetlike member 73a is formed with two plies 82 and 83 connected by a fold line 84 cut through, except at vertically spaced inner tear lines 85 and 86, in the same positions on each ply, to define a pair of tabs 87 and 88, each connected by a vertical hinge to the member 73a. These tabs, 87 and 88, have adhesive coatings 89, 89 on their remote or nonengaging faces. The remaining portions of the two plies 82 and 83 may be adhesively secured together and must necessarily be between the portions forming a rectangular vertical marginal extension 90 bearing price and related indicia. The assembled relation of the card 65, envelope 66 and intermediate member 73a is shown in Fig. 16. When the member 73a is pulled outwardly from the right edge of the assembly, the tabs 87 and 88 will be separated therefrom by ready breaking of the four inner tear lines 85 and 86, leaving tab 87 adhered to the back face 70 of the card and tab 88 adhered to the upper portion of the adjacent face of the envelope 66 in the position indicated. The vertical hinge connections provided by the spaced tear lines 85 and 86 of tabs 87 and 88 are particularly advantageous in maintaining the card and envelope in assembled relation against relative turning or rotation and separation of the corresponding upper and lower portions from each other.

The modification illustrated by Figs. 17, 18 and 19 is concerned with a different manner of adhesively securing the French-folded greeting card 30, the envelope 31 and the insert sheet 32 of Fig. 1 in the same assembled relation. Referring to the exploded perspective view of Fig. 17, attention is directed to a corner or corner pocket member 100 of two-ply construction, which is preferably formed from paper. The corner pocket 100 has adjacent seams or fold lines 101 and 102 arranged at right angles to each other and spanned at their ends by an entrance slit 103 for receiving the adjacent superimposed corners of the insert sheet 32 and the envelope 31. As in the case of Fig. 1, the envelope closure flap 37 is arranged so that its hinged portion will coincide with the vertical fold line 33 of the card when full insertion is made, the sheet 32 being interleaved with the flap 37 for locking purposes.

The corner pocket 100 will be disposed at the lower end of the vertical marginal portion 38 of the insert sheet 32 so that a price or other indicia 105 common to the vertical and horizontal margins of said pocket will be visible with the indicia carried by marginal portion 38. When the card 30, envelope 31, insert sheet 32 and pocket member 100 are in the assembled relation shown by Fig. 18, an adhesive spot or area 106 on the uppermost side of the corner pocket will be connected directly with the adjacent corner portion of the inside of the inner sheet 36 of the folded card 30. By locating this adhesive connection as near the lower corner as practical, full benefit will be taken of the locking against relative turning provided by the intersection of the vertical and horizontal fold lines 33 and 34.

As will be obvious, a simple outward diagonal pull on the corner pocket 100 will break the adhesive connection, and release the envelope 31 and insert sheet 32 from the card 30 and each other.

Figs. 20 and 21 illustrate a modified corner 100a which is somewhat more economical because of its simpler and abbreviated construction.

The modified corner 100a provides separated seams or fold lines 101a and 102a extending at right angles to each other and having entrance and exit slits 103a and 104 therebetween. A price mark 105a has been applied to the vertical marginal extension, but indicia could also be applied to the corresponding horizontal extension. It will be observed that the ply of the corner 100a which bears the indicia is also provided with an adhesive coating 106a applied to a central tab 107 extending from the entrance slit edge and hingedly connected to the ply by a perforated tear line 108.

The insert sheet 32, the envelope 31 with which it is interleaved as before, and the inner sheet 36 of the greeting card have their corresponding corners held together by the corner 100a as illustrated best in Fig. 21. The inside of the inner sheet 36 of the card is connected directly to the corner member 100a by means of the adhesive coating 106a carried by the adjacent face of the tab 107. The indicia bearing the vertical marginal portion of the insert sheet 32 is arranged to extend above the corner member 100a.

Separation of the card 30, envelope 31, insert sheet 32 and corner 100a is accomplished by a pulling on the latter to break the hinged connection at the tear line 108, leaving the tab 107 permanently adhered to the inside of the inner card sheet 36 with only the noncoated face exposed. Use of the separable tab 107 to carry the adhesive insures that there will be no sticking together of the card sheets 35 and 36 when the envelope 31 is separated therefrom.

It is contemplated that the greeting card, envelope and price bearing insert sheet may be supplied to the trade in an assembled relation such as illustrated in Fig. 2, but without application of any particular adhesive. This will permit the convenient addition of any suitable adhesive bond between the insert sheet and the unexposed face of the adjacent card sheet by the retailer or retail distributor. In this manner the assembly operation may be divided between interleaving with assembly and adhesive securing of the assembly, which latter is practically necessary to secure the full benefits of this invention.

The corner or corner pocket members 100 and 100a illustrated in Figs. 17 through 20 are separately claimed as articles of manufacture, and in different associations with greeting card and envelope assemblies in my copending application Serial No. 781,579 filed October 23, 1947.

While preferred embodiments and several modifications of the greeting card and envelope assembly of this invention have been described in detail, it will be appreciated that numerous changes may be made in details of construction and arrangement of parts without departing from the principles thereof and the scope of the present claims.

Having thus described my invention, what I claim as novel and desire to secure by Letters Patent of the United States is:

1. The combination comprising a French-folded greeting card, an envelope therefor having a closure flap and disposed between the two sheets of the card with the hinge of said closure flap coinciding with the vertical fold line of the card and an adjacent edge of the envelope coinciding with the horizontal fold line of the card, an insert sheet extending between said closure flap and the envelope proper, said insert sheet bearing indicia on an exposed marginal portion extending beyond a pair of unfolded edges of the card, and a direct adhesive connection between the inner sheet of the card and the insert sheet.

2. The combination comprising a French-folded greeting card, an envelope therefor having a closure flap and disposed between the two sheets of the card with the hinge of said closure flap coinciding with the vertical fold line of the card and an adjacent edge of the envelope coinciding with the horizontal fold line of the card, an insert sheet coextensive with the envelope extending between said closure flap and the envelope proper, said insert sheet bearing indicia on an exposed marginal portion extending beyond a pair of unfolded edges of the card, and a direct adhesive connection between the inner sheet of the card and the insert sheet at a point remote from the horizontal fold line.

3. An assembly comprising a cut out French-folded greeting card having the horizontal fold line at the bottom, an envelope therefor having a closure flap, an insert sheet interleaved with the closure flap thereof positioned on the side adjacent the inner sheet of the card, said envelope and sheet being disposed between the two sheets of the card with the hinge of the envelope closure flap coinciding with the vertical fold line of the card and an adjacent edge of the envelope being supported by the horizontal fold of the card, and a direct adhesive connection between the adjacent upper corner portions of the inner sheet of the card and the insert sheet.

4. An assembly comprising a cut out French-folded greeting card having the horizontal fold line at the bottom, an envelope therefor having a closure flap, an insert sheet coextensive with the envelope and interleaved with the closure flap thereof positioned on the side adajcent the inner sheet of the card, said envelope and sheet being disposed between the two sheets of the card with the hinge of the envelope closure flap coinciding with the vertical fold line of the card and an adjacent edge of the envelope and the corresponding edge of the insert sheet being supported by the horizontal fold of the card, and a direct adhesive connection between the adjacent upper corner portions of the inner sheet of the card and the insert sheet.

5. The combination comprising a French-folded greeting card, an envelope therefor having a closure flap, an insert sheet interleaved with the closure flap, said envelope and insert sheet being disposed between the two sheets of the card with the closure flap and insert sheet adajcent the inner sheet of the card, the hinge of the envelope closure flap coinciding with the vertical fold line of the card and an adjacent edge of the envelope coinciding with the horizontal fold line of the card, said insert sheet having a cut out flap with a short hinged connection, and a direct adhesive connection between the inner sheet of the card and the insert sheet through said flap, whereby a pull on the insert sheet will break the hinged connection and separate said flap.

6. The combination comprising a French-folded greeting card, an envelope therefor having a closure flap, an insert sheet coextensive with the envelope interleaved with the closure flap, said envelope and insert sheet being disposed between the two sheets of the card with the closure flap and insert sheet adjacent the inner sheet of the card, the hinge of the envelope closure flap coinciding with the vertical fold line of the card and an adjacent edge of the envelope coinciding with the horizontal fold line of the card, said insert sheet having a cut out flap with a short hinged connection, said flap being adjacent the end remote from the horizontal fold line, and a direct adhesive connection between the inner sheet of the card and the insert sheet through said flap, whereby a pull on the insert sheet will break the hinged connection and separate said flap.

7. An assembly comprising a greeting card, an envelope therefor having a closure flap, said envelope being arranged with a marginal portion extending uniformly beyond the limits of the card, an intermediate sheetlike member positioned between the back face of the card and a portion of the closure flap face of the envelope not covered by said flap, said intermediate member being formed and arranged to provide a rectangular strip overlying said extending marginal portion of the envelope and having a pair of tabs in face-to-face engagement and hingedly interconnected to the remainder of said intermediate member by tear lines, and direct adhesive connections between the remote faces of the tabs of the intermediate member and the card and envelope, respectively.

8. An assembly comprising a greeting card, an envelope therefor having a closure flap, said envelope being arranged with a marginal portion extending uniformly beyond the limits of the card, an intermediate sheetlike member positioned between the back face of the card and a portion of the closure flap face of the envelope not covered by said flap, said intermediate member being formed and arranged to provide a rectangular strip overlying said extending marginal portion of the envelope and extending therebeyond and having a pair of tabs in face-to-face engagement and hingedly connected to each other along a tear line and by short lengths of one tab to the remainder of said intermediate member, and direct adhesive connections between the remote faces of the tabs of the intermediate member and the card and envelope, respectively.

9. An assembly comprising a greeting card, an envelope therefor, said envelope being arranged with a marginal portion extending uniformly beyond the limits of the card, and an intermediate sheetlike member secured to a face of the envelope and having a limited area of direct adhesive connection with the adjacent face of the card, said sheet like member being formed and arranged to provide an extension overlying said extending marginal portion of the envelope for receiving price or other indicia, whereby the idicia may be removed upon separation of the card and envelope.

10. The combination comprising a French-folded greeting card, a slightly larger envelope therefor having a closure flap and disposed between the two sheets of the card with one edge of said envelope coinciding with the vertical fold line of the card and an adjacent edge of the envelope coinciding with the horizontal fold line of the card, and an insert sheet extending between said closure flap and the envelope proper, said insert sheet bearing indicia on an exposed marginal portion extending beyond a pair of unfolded edges of the card.

11. The combination comprising a French-folded greeting card, a slightly larger envelope therefor having a closure flap and disposed between the two sheets of the card with a closure flap adjacent the inner sheet and with the hinge of said closure flap coinciding with the vertical fold line of the card and an adjacent edge of the envelope coinciding with the horizontal fold line of the card, and an insert sheet extending between said closure flap and the envelope proper, said insert sheet bearing indicia on an exposed marginal portion extending beyond a pair of unfolded edges of the card.

12. The combination comprising a French-folded greeting card, a slightly larger envelope therefor having a closure flap and disposed between the two sheets of the card with the closure flap adjacent the inner sheet and with the hinge of said closure flap coinciding with the vertical fold line of the card and an adacent edge of the envelope coinciding with the horizontal fold line of the card, an insert sheet of the same size as the envelope extending between said closure flap and the envelope proper, said insert sheet thus providing horizontal and vertical marginal portions extending beyond adjacent pairs of unfolded edges of the card, and price indicia on one of said marginal portions where it may be viewed by a person examining the card in either opened or closed condition.

WILLIAM C. BAYNES.

REFERENCES CITED

The following references are of record in the file of this patent:

UNITED STATES PATENTS

| Number | Name | Date |
|---|---|---|
| 2,292,924 | Bourke | Aug. 11, 1942 |
| 2,323,653 | Fowler, Jr. | July 6, 1943 |
| 2,336,867 | Huber | Dec. 14, 1943 |